US008462046B2

(12) United States Patent
Syrjarinne et al.

(10) Patent No.: US 8,462,046 B2
(45) Date of Patent: Jun. 11, 2013

(54) MANAGING THE MEASUREMENT OF SIGNALS

(75) Inventors: Jari Tapani Syrjarinne, Tampere (FI); Kimmo Marko Tapani Alanen, Lempaala (FI); Tuomo Tapani Honkanen, Tampere (FI); Pertti Samulli Pietila, Tampere (FI); Jani Mikael Kappi, Ylojarvi (FI)

(73) Assignee: Nokia Corporation, Espoo (FI)

( * ) Notice: Subject to any disclaimer, the term of this patent is extended or adjusted under 35 U.S.C. 154(b) by 260 days.

(21) Appl. No.: 13/121,812

(22) PCT Filed: Oct. 1, 2008

(86) PCT No.: PCT/EP2008/063157
§ 371 (c)(1),
(2), (4) Date: Mar. 30, 2011

(87) PCT Pub. No.: WO2010/037416
PCT Pub. Date: Apr. 8, 2010

(65) Prior Publication Data
US 2011/0175773 A1 Jul. 21, 2011

(51) Int. Cl.
*G01S 19/34* (2010.01)
(52) U.S. Cl.
USPC .................................... 342/357.74
(58) Field of Classification Search
USPC .................................... 342/357.74
See application file for complete search history.

(56) References Cited

U.S. PATENT DOCUMENTS 5,448,773 A 9/1995 McBurney et al.
7,499,700 B2 * 3/2009 Dillon et al. .............. 455/423
7,702,370 B2 * 4/2010 Persico .................... 455/574
2003/0107514 A1 6/2003 Syrjarinne et al.
2005/0083230 A1 4/2005 Harvey et al.
2006/0211430 A1 9/2006 Persico
2008/0291979 A1 11/2008 Normark et al.

FOREIGN PATENT DOCUMENTS

WO 9747986 12/1997
WO 2007064250 6/2007

OTHER PUBLICATIONS

Notification of Transmittal of the International Search Report (3 pages); International Search Report dated Jul. 29, 2009 in International Patent Application No. PCT/EP2008/063157 (4 pages); Written Opinion (6 pages)—13 pages total.
"POSTAR GPS Project" beacon dodsworth, Nov. 23, 20007, 6 pages.
International Preliminary Report on Patentability dated Apr. 14, 2011 in parallel International Application No. PCT/EP2008/063157 (8 pages).

* cited by examiner

*Primary Examiner* — Harry Liu
(74) *Attorney, Agent, or Firm* — Locke Lord LLP

(57) ABSTRACT

For managing measurements on signals, a quality of received signals, for which a measurement circuit provides measurement results, is monitored. In the case that the quality does not exceed a set quality before an end of a reporting period, a reporting of measurement results that are available at the end of the reporting period is caused. In the case that the quality exceeds the set quality at a measurement instant before the end of the reporting period, the measurement circuit is put to a sleep mode and a reporting of extrapolated measurement results is caused, the extrapolated measurement results being measurement results from a measurement instant before the measurement circuit was put to a sleep mode extrapolated to the end of the reporting period.

21 Claims, 4 Drawing Sheets

MANAGING THE MEASUREMENT OF SIGNALS

FIELD OF THE DISCLOSURE

The invention relates to the field of the measurement of signals.

BACKGROUND

Signals are received and measured for various purposes. Satellite signals or other beacon signals may be measured for example for enabling a positioning of a device receiving the signals.

A positioning of a device is supported for instance by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time. Moreover, pseudorange contains various error terms including troposphere and ionosphere delay as well as multipath.

In one possible solution scheme, the offset between the satellite and system clocks is assumed known and the problem reduces to solving a non-linear set of equations of four unknowns (three receiver position coordinates and the offset between the receiver and GPS system clocks). Therefore, measurements from at least four satellites are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

GNSS and assisted GNSS are used more and more for location based services which are mostly focusing around personal navigation. GNSS and assisted GNSS technology is integrated to this end for instance in personal navigation devices (PND) and mobile terminals like smart phones.

In a typical implementation, a GNSS receiver measures the satellite signals, calculates the position solution and delivers the position information to the navigation application. In turn, the navigation application estimates the location of the user on the map and on the route and then updates the display accordingly. A good navigation experience requires frequent position and velocity updates from the GNSS receiver. PNDs and navigation enabled smart phones could update the position information for example once a second, which means that also the GNSS receiver needs to operate at that rate.

While measurements of signals have been described by way of example with reference to GNSS based applications, it becomes readily apparent that also various other applications may rely on measurement results that are reported at fixed reporting intervals.

SUMMARY OF SOME EMBODIMENTS OF THE INVENTION

A method is described, which comprises monitoring a quality of received signals for which a measurement circuit provides measurement results. The method further comprises in the case that the quality does not exceed a set quality before an end of a reporting period, causing a reporting of measurement results that are available at the end of the reporting period. The method further comprises in the case that the quality exceeds the set quality at a measurement instant before the end of the reporting period, putting the measurement circuit to a sleep mode and causing a reporting of extrapolated measurement results. The extrapolated measurement results are measurement results from a measurement instant before the measurement circuit was put to a sleep mode extrapolated to the end of the reporting period.

Moreover, a first apparatus is described, which comprises a control circuitry. The control circuitry is configured to monitor a quality of received signals for which a measurement circuit provides measurement results. The control circuitry is further configured to cause a reporting of measurement results that are available at the end of a reporting period, in the case that the quality does not exceed a set quality before an end of the reporting period. The control circuitry is further configured to put the measurement circuit to a sleep mode and to cause a reporting of extrapolated measurement results, in the case that the quality exceeds the set quality at a measurement instant before the end of the reporting period, the extrapolated measurement results being measurement results from a measurement instant before the measurement circuit was put to a sleep mode extrapolated to the end of the reporting period.

The apparatus may comprise for example exclusively the described control circuitry, but it may also comprise additional components. The control circuitry can comprise hardware and/or software components. It may comprise for instance a processor for executing computer program code for realizing the required functions, a memory storing the program code, or both. Alternatively, it could comprise for instance a pure hardware circuit that is designed to realize the required functions, for instance implemented in a chipset or a chip, like an integrated circuit. The apparatus could further be for example a module provided for integration into an electronic device, or it could be such a device itself.

Moreover, a second apparatus is described, which comprises means for monitoring a quality of received signals for which means for measuring provide measurement results; means for causing a reporting of measurement results that are available at the end of a reporting period in the case that the quality does not exceed a set quality before an end of a reporting period; means for putting the measurement circuit to a sleep mode in the case that the quality exceeds a set quality at a measurement instant before the end of the reporting period; and means for causing a reporting of extrapolated measurement results in the case that the quality exceeds the set quality at a measurement instant before the end of the reporting period, the extrapolated measurement results being measurement results from a measurement instant before the measurement circuit was put to a sleep mode extrapolated to the end of the reporting period.

The means of this apparatus can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit. It is to be understood that further or correspondingly adapted means may be comprised for realizing any of the functions that may optionally be implemented in any described embodiment of the first apparatus.

Moreover, a computer readable storage medium is described, in which computer program code is stored. The computer program code realizes the described method when executed by a processor. The computer readable storage medium could be for example a disk or a memory or the like. The computer program code could be stored in the computer readable storage medium in the form of instructions encoding the computer-readable storage medium. It is to be understood that also the computer program code by itself has to be considered an embodiment of the invention.

Thus, certain embodiments of the invention provide that results of measurements on received signals output by a measurement circuit can be extrapolated in good signal times until the end of a reporting period. The extrapolated measurement results may then be provided for example at a reporting instant of original measurement results. If the required signal quality is set to an appropriate value, it may be ensured that also such extrapolated measurement results have a sufficient quality. During the extrapolation period between the last measurement instant and an instant of reporting the extrapolated measurement results, new input from the measurement circuit is not needed so that at least the measurement circuit can be put to a sleep mode. As a result, the time during which a signal measurement circuit can be switched off may be maximized flexibly for each reporting period depending on the current signal quality, in order to achieve maximum power savings. The extrapolation period could start as soon a received signal is found to have a sufficient quality, but it is to be understood that additional criteria can be considered in addition. In bad signal conditions, the entire reporting period could be utilized and the obtained measurement results be reported without extrapolation. The original measurement results and the extrapolated measurement results, respectively, may be provided at the end of a reporting period to any unit that needs the measurement results for some kind of processing. The extrapolation can be realized at any time between the last measurement instant and the reporting instant. If the unit to which the measurement results are reported does not rely on receiving measurement results at regular intervals, the extrapolated measurement results could also be reported at any time between the extrapolation and the end of the reporting period.

The measurements on the received signals could comprise for example carrier phase measurements, code phase measurements or measurements of a Doppler effect on the carrier frequency, the time in track, the carrier to noise ratio (CNO), or any other kind of measurement. The time in track, for example in milliseconds, is the time how long the signal was actually measured between the reporting intervals.

If the measurement circuit has been put to a sleep mode, it can be woken up again at a fixed point of time or at a variable point of time. In some embodiments of the described method or the described computer program code, when the measurement circuit is put to a sleep mode, it is activated again at a beginning of a next reporting period or at a predetermined time before a beginning of a next reporting period or at a point of time before a beginning of a next reporting period that depends on a length of an extrapolation required for the current reporting period. In corresponding embodiments of one of the described apparatuses, the control circuitry or some other means is configured to realize a corresponding reactivation.

In some embodiments of the described method or the described computer program code, the quality of received signals is monitored by evaluating at least one of the following quantities: a dilution of precision determined for satellites transmitting the received signals, uncertainties in measuring a code phase of the received signal, uncertainties in measuring a Doppler effect on the frequency of the received signal, and a circular error probable. In corresponding embodiments of one of the described apparatuses, the control circuitry or some other means is configured to realize a corresponding monitoring.

Code phase and Doppler uncertainties could be estimated mainly based on the carrier to noise ratio, the time in track and statistical properties of the tracking loop. Some ad hoc variations may exist, for example to take into account effects from multipath signals.

Dilution of precision (DOP) is a value representing the influence of the geometric distribution of GNSS satellites, which might be transmitting the received signals in certain embodiments, on the achievable accuracy of positioning calculations based on these signals. When the satellites are far apart, the achievable position accuracy is considered to be better and the value is low. When the satellites are close together, the achievable position accuracy is considered to be worse and the value is high. Other factors can increase the effective DOP. Equally in the context of GNSS, the term circular error probable (CEP) means that an indicated percentage of all determined positions of a device is located within an equally indicated radius. DOP and CEP could be estimated from the direction cosine vectors forming the direction cosine matrix H. DOP could be a computational result from the inverse of the squared H-matrix: DOP=diag(inv (H'H)), where diag denotes the sum of the diagonal elements of the inversed squared H. A CEP estimation could be based on the DOP and an average measurement standard deviation as CEP=DOP×STD_meas. DOP is unitless and CEP has the unit meter. If the measurements are carried out in another entity than the processing of the measurements, the direction cosine vectors could be delivered from the processing entity to the measuring entity for DOP evaluation, since the measurement entity might not have position calculation capabilities but means to estimate the DOP from the direction cosine vectors.

The at least one evaluated quantity could include in a certain embodiment extrapolation errors that are expected to occur due to the extrapolation until the end of the reporting period. This means that for a longer extrapolation period, the signal quality has to be better than for a shorter extrapolation period to ensure that the finally obtained extrapolated measurement results have a sufficient quality.

The set signal quality may be fixed or variable. If it is variable, it may be adjusted for example based on received information on a desired signal quality or based on received information on a desired accuracy of computation results that is to be achieved with the reported measurement results. Such a computation result could be for example a position that is to be computed based on the measurement results. Either information can be provided for instance as control information by a unit to which the original or extended measurement results are reported.

In one embodiment of the described method or the described computer program code, control information is received. The control information may comprise at least one of a maximum length for a required extrapolation that has to be ensured before putting the measurement circuit to the sleep mode, at least one target value for adjusting the set quality, a target value for an accuracy of position information, which is to be determined based on the reported measurement results, as a basis for adjusting the set quality, intermediate results enabling an estimation of an expected accuracy of position information, which is to be determined based on the reported measurement results, including for example direction cosine vectors for each satellite for dilution of precision calculations, and a length of the reporting period. In a corresponding embodiment of one of the described apparatuses, the control circuitry or some other means is configured to support a corresponding reception of control information. In general, various kinds of control information or configuration values could be provided by some unit within or outside of the apparatus, for example by the unit receiving the report on the measurement results.

In one embodiment of the described method or the described computer program code or one of the described apparatuses, the measurement results are reported as a basis for positioning calculations and/or a navigation application.

In one embodiment of the described method or the described computer program code or one of the described apparatuses, the received signals are signals transmitted by satellites of a global navigation satellite system.

In one embodiment of the described first apparatus, the apparatus comprises in addition the measurement circuit.

The control circuitry and the measurement circuit could belong for instance to a measurement engine and the control circuitry could be configured to report the measurement results to a positioning engine, even though a separation between measurement engine and positioning engine is not required.

In one embodiment of the described first apparatus, the apparatus comprises in addition such a positioning engine. The positioning engine could then be configured to determine a position of the apparatus based on reported measurement results for use by a navigation application.

In one embodiment of one of the described apparatuses, the apparatus is a module for an electronic device.

In one embodiment of the described first apparatus, the apparatus comprises in addition a display and/or an antenna. The display could be configured to present computation results that are based on the reported measurement results to a user. The antenna could be configured to receive the signals at the apparatus.

In one embodiment of one of the described apparatuses, the apparatus is a mobile communication device or a personal navigation device.

In one embodiment, a method is an information providing method, comprising the steps of monitoring a quality of received signals for which a measurement circuit provides measurement results; in the case that the quality does not exceed a set quality before an end of a reporting period, causing a reporting of measurement results that are available at the end of the reporting period; and in the case that the quality exceeds the set quality at a measurement instant before the end of the reporting period, putting the measurement circuit to a sleep mode and causing a reporting of extrapolated measurement results at the end of the reporting period, the extrapolated measurement results being measurement results from a measurement instant before the measurement circuit was put to a sleep mode extrapolated to the end of the reporting period.

In a further embodiment, an apparatus is an information providing apparatus comprising means for monitoring a quality of received signals for which means for measuring provide measurement results; means for causing a reporting of measurement results that are available at the end of a reporting period in the case that the quality does not exceed a set quality before an end of a reporting period; means for putting the measurement circuit to a sleep mode in the case that the quality exceeds a set quality at a measurement instant before the end of the reporting period; and means for causing a reporting of extrapolated measurement results at the end of the reporting period in the case that the quality exceeds the set quality at a measurement instant before the end of the reporting period, the extrapolated measurement results being measurement results from a measurement instant before the measurement circuit was put to a sleep mode extrapolated to the end of the reporting period.

In one embodiment of the invention, the described method can be seen as a method for managing the measurement of signals and one of the described apparatuses can be seen as an apparatus for managing the measurement of signals.

The described embodiments can be used for managing signal measurements on any kind of signals, in particular, though not exclusively, on satellite signals. Such satellite signals may comprise satellite signals transmitted in a GNSS, like GPS, GLONASS, GALILEO, SBAS, QZSS, LAAS or a combination of these. LAAS makes use of pseudolites instead of true satellites, but these pseudolites are to be understood to be covered as well by the term satellite as used in this application. LAAS has the advantage that it enables a positioning under indoor conditions as well. Examples of other signals than satellite signals are signals transmitted by access stations, which could equally be used for a positioning of a device if the location of the access stations is known.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
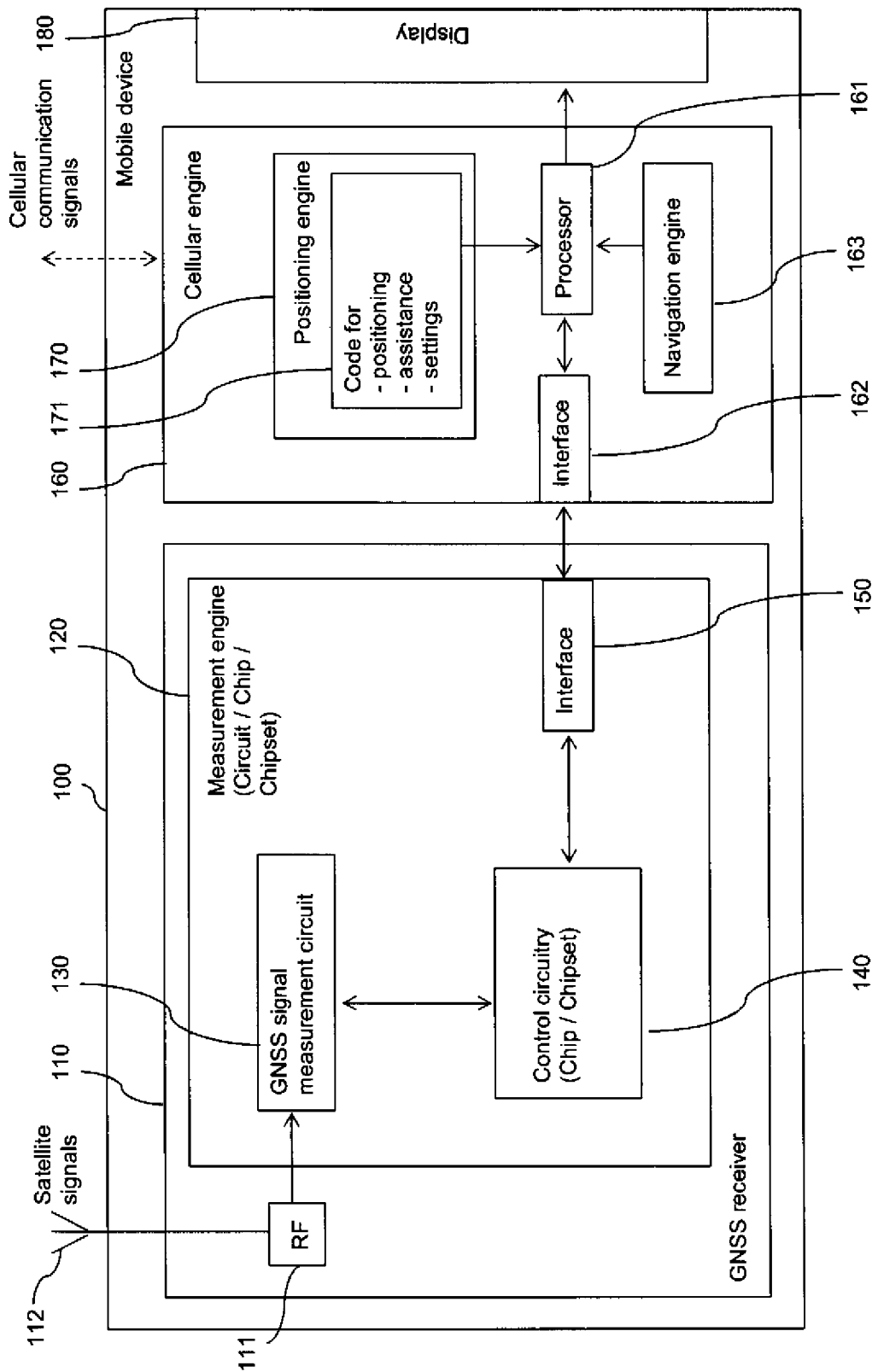
FIG. 1 is a schematic block diagram of an exemplary embodiment of a device according to the invention.

FIG. 1 is a schematic block diagram of an exemplary device 100, which employs extrapolation for enabling the use of adaptive measurement periods for measuring signals.

The device 100 could be for example a mobile device, like a mobile phone or a personal navigation device.

The device 100 comprises a GNSS receiver 110, a cellular engine 160 and a display 180. It comprises in addition various other components not shown.

The GNSS receiver 110 could be for instance a GPS receiver, a Galileo receiver, a GLONASS receiver, etc., or a combination of any of these.

The GNSS receiver 110 comprises a radio frequency (RF) unit 111 configured to receive GNSS signals via a GNSS antenna 112. The RF unit 111 could comprise for example an amplifier for amplifying the received satellite signals and an analog to digital converter for converting the received signals into signal samples.

The GNSS receiver 110 moreover comprises a measurement engine 120. The measurement engine 120 could be realized in the form of a circuit, optionally integrated on a chip or a chipset. It may be implemented in hardware, in software or in a combination of both.

The measurement engine 120 comprises a GNSS signal measurement circuit 130 that is linked to the RF unit 111. The GNSS signal measurement circuit 130 could comprise for instance processing components for acquiring and tracking received satellite signals. A processing chain, including a sample memory, a mixer linked to an oscillator, a decimation block, correlators or a matched filter, a coherent memory and/or a non-coherent memory, could enable for example a determination of a code phase and of a Doppler frequency of received signals. The GNSS signal measurement circuit 130 outputs measurement results that may include for example code phase and Doppler frequency. In addition, it might be configured to extract and provide navigation data like ephemeris from the tracked satellite signals. The GNSS signal measurement circuit 130 is linked within the measurement engine 120 via a control circuitry 140 to an interface 150. The control circuitry 140 enables a flexible shut-down of the GNSS signal measurement circuit 130. The interface enables a communication with a positioning engine 170.

The cellular engine 160 is configured to enable communications between the device 100 and a cellular network, including modulating and demodulating tasks. The cellular engine 160 comprises or is linked to a processor 161 that is configured to execute various implemented program code that may be retrieved to this end from a memory. The implemented code may comprise code for the cellular engine, but equally code for some other engines, including code 171 for the positioning engine 170 and code for a navigation engine 163. It is to be understood that the positioning engine 170 and/or the navigation engine could be embedded alternatively in some other component of the device 100, like an application processor, or be included in the device 100 as independent components. The program code 171 for the positioning engine 170 includes functional modules for determining a position and velocity of the device 100 based on GNSS signal measurements, functional modules for using assistance, and functional modules for determining settings for the measurement engine 120. The code for the navigation engine, when executed by the processor 161, is configured to use the position and velocity determined by the positioning engine for determining and presenting navigation information on the display 180. The positioning engine 170 is able to interact with the measurement engine 140 by means of the processor 161 via an interface 162.

The presented device 100 implements thus by way of example a measurement engine (ME)-positioning engine (PE) architecture. The ME-PE architecture splits the functions of a GNSS receiver at a high abstraction level, separating the network assistance data and position information processing functions from the actual real-time processing of the GNSS signals, typically taking place in the hardware. This kind of architecture is also called host-based architecture. The host can be for example the cellular engine 160 or an application processor.

The measurement engine 120 may be responsible for time keeping, satellite signal acquisition, and measurements under the control of the positioning engine 170. The positioning engine 170 may then calculate-user position, velocity, and accurate time based on the measurement results and data collected by the measurement engine 120.

When the software of the positioning engine is implemented or embedded, for example, in the software of a mobile terminal that is provided for cellular communications, it may be particularly easy to combine a GNSS signal based positioning with other complementary measurement sources to create a hybrid position solution such as with motion sensors or Wi-Fi® positioning. In this case, it might even be possible to shutdown the GNSS receiver 110 altogether and to continue positioning with non-GNSS technologies if GNSS signals are unavailable, for instance when navigating indoors. The positioning engine 170 could be configured to advise the measurement engine 120 to commence duty cycling or lower operating frequency if, for example, the satellite signals are found strong and not all the features and/or performance supported by the measurement engine 120 are needed.

It is to be understood, however, that the presented ME-PE architecture is not a necessity for implementing an embodiment of the invention. In particular any other architecture could be used, in which the real-time signal processing functions are isolated from the non-real-time functions.

There are many alternatives for implementing the control circuitry 140 of the measurement engine 120.

Figure 2:
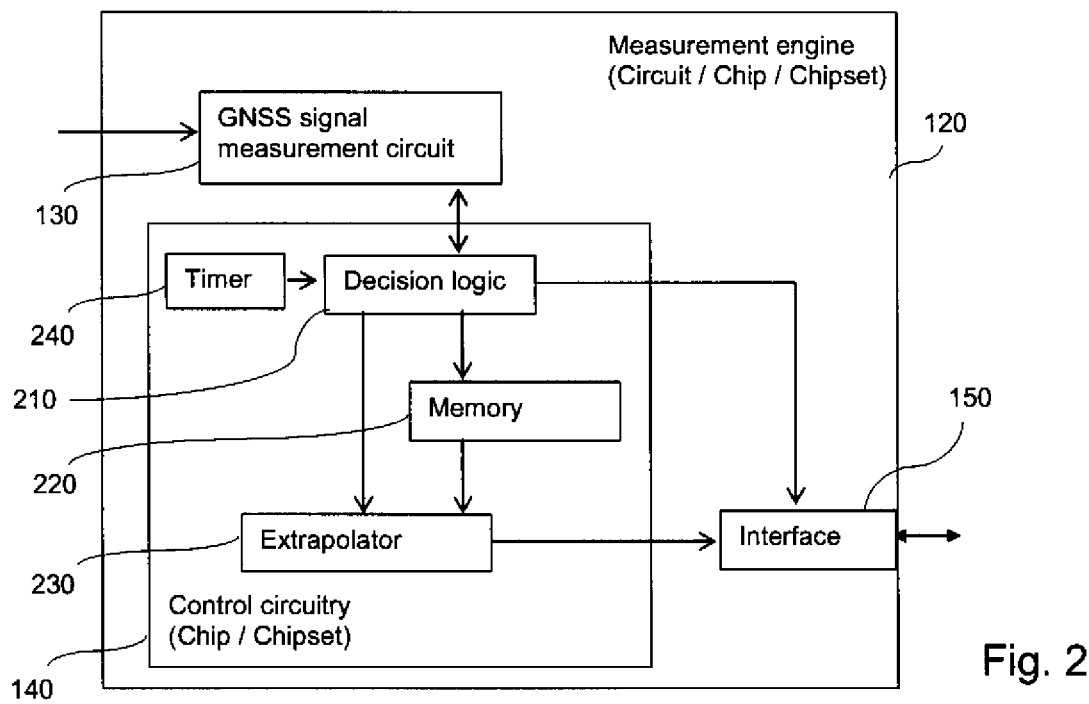
FIG. 2 is a schematic block diagram presenting a first exemplary implementation of a measurement engine of the device of FIG. 1.

FIG. 2 is a high-level block diagram of a first implementation option, in which the functions of the control circuitry 140 are realized in hardware.

In this option, the control circuitry 140 includes various circuitry modules, including a decision logic 210 for monitoring the signal quality of received satellite signals and for putting the GNSS signal measurement circuit to a sleep mode as well as for waking it up again, a non-volatile memory 220 for storing measurement results, an extrapolator 230 for extrapolating measurement results from the memory 220, and a timer 240 for indicating the end of a reporting period and other set instants of time. The decision logic 210 is linked to the GNSS signal measurement circuit 130 and moreover to the interface 150, to the timer 240, to the memory 220 and to the extrapolator 230. The memory 220 is further linked via the extrapolator 230 to the interface 150. The control circuitry 140 of FIG. 2 could be integrated for example in a single chip or in a chipset.

Figure 3:
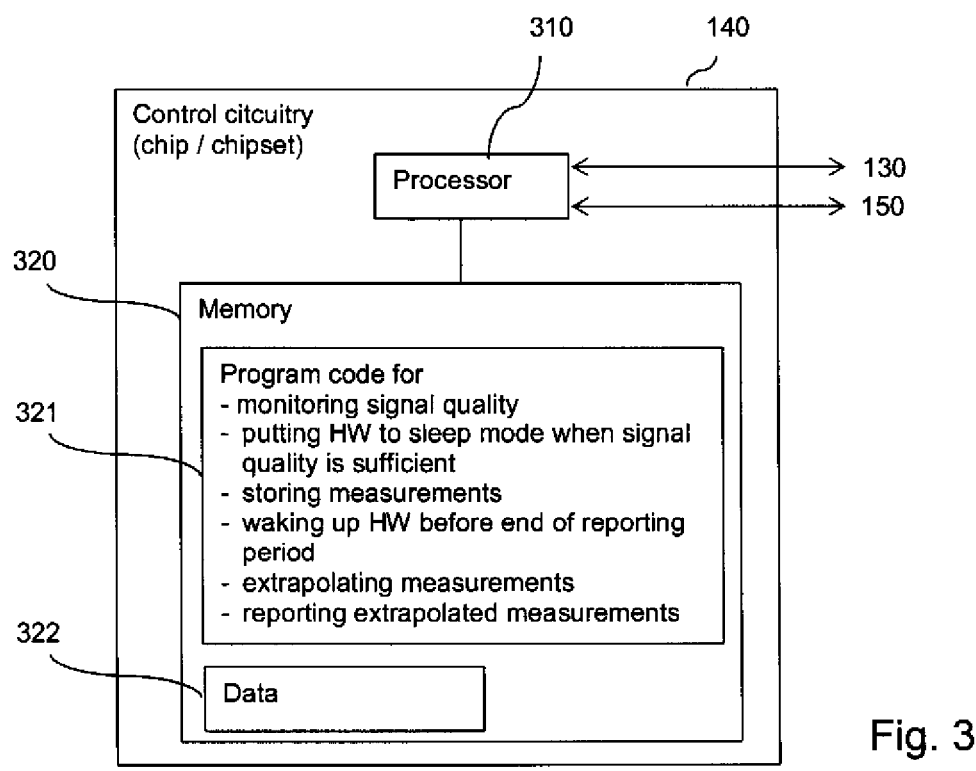
FIG. 3 is a schematic block diagram presenting a second exemplary implementation of a measurement engine of the device of FIG. 1.

FIG. 3 is a high-level block diagram of a second implementation option, in which the main functions of the control circuitry 140 are realized in software.

In this option, the control circuitry 140 includes a processor 310 that is configured to execute implemented program code. It comprises in addition a non-volatile memory 320, which includes a section 321 for storing program code and a section 322 for storing data, like measurement results and settings. The program code includes a functional module for monitoring the signal quality of received GNSS signals based on measurement results of the GNSS signal measurement circuit 130, a functional module for putting the measurement hardware to a sleep mode when the signal quality is sufficient, a functional module for storing measurement results in the memory 320, a functional module for waking up the measurement hardware before the end of a reporting period, a functional module for extrapolating stored measurement results and a functional module for reporting extrapolated measurement results. The processor 310 may retrieve the stored program code from the memory 320 for execution. In addition, it includes a clock that can be used for timing purposes. The processor 310 is arranged and configured to interact with the GNSS signal measurement circuit 130 and the interface 150. The control circuitry 140 of FIG. 3 formed by processor 310 and memory 320 could be integrated for example in a single chip or in a chipset.

The operation of the control circuitry 140 will now be described in more detail with reference to the flow chart of FIG. 4. The operations will be described to be realized by the corresponding functional blocks of the control circuitry 140 of FIG. 2. It is to be understood, however, that the same operations could be realized as well for example by the processor 310 of FIG. 3 when executing corresponding functional modules of the code 321 retrieved from memory 320.

Figure 4:
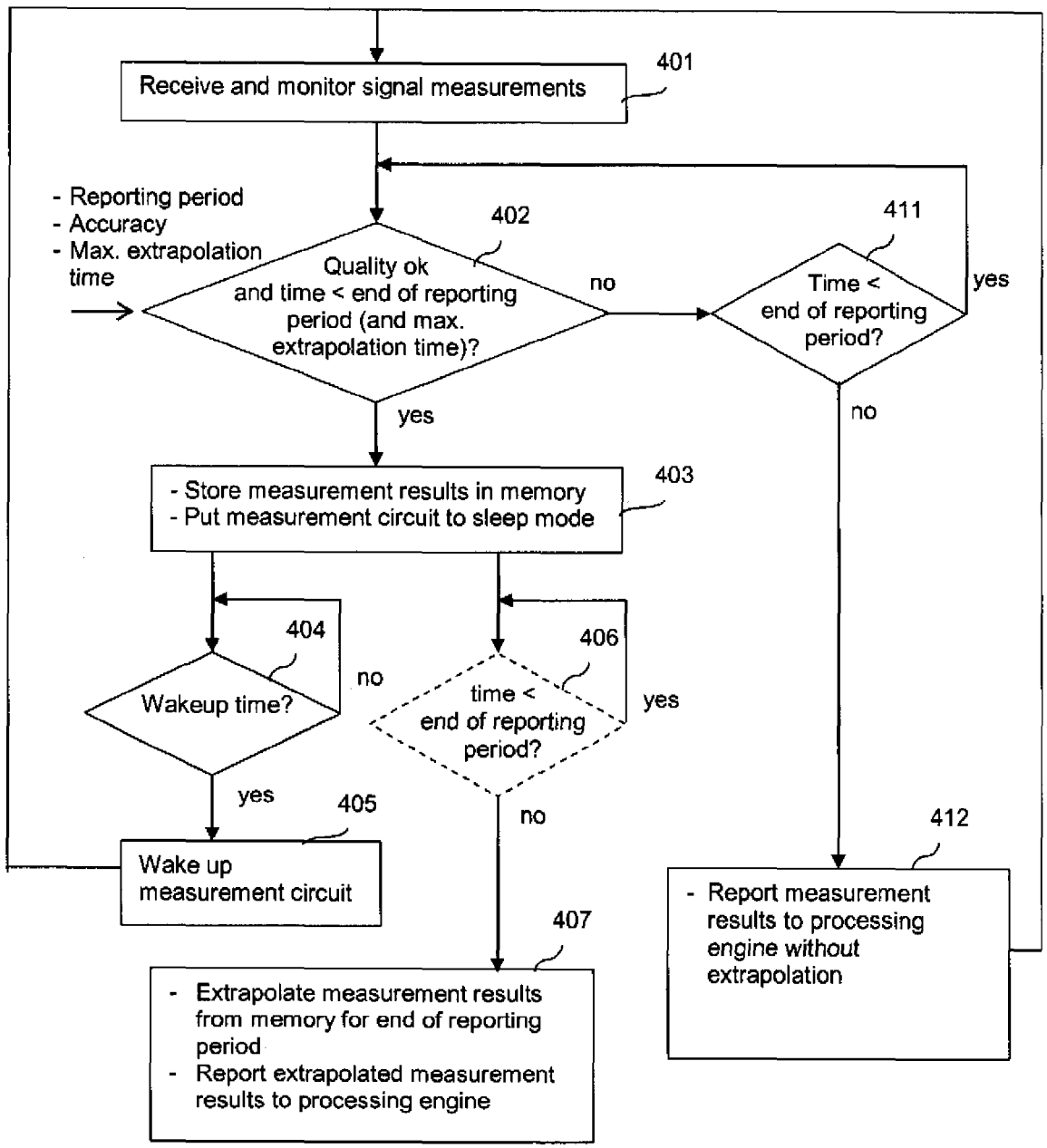
FIG. 4 is a flow chart illustrating an exemplary operation in the device of FIG. 1.
Figure 5:
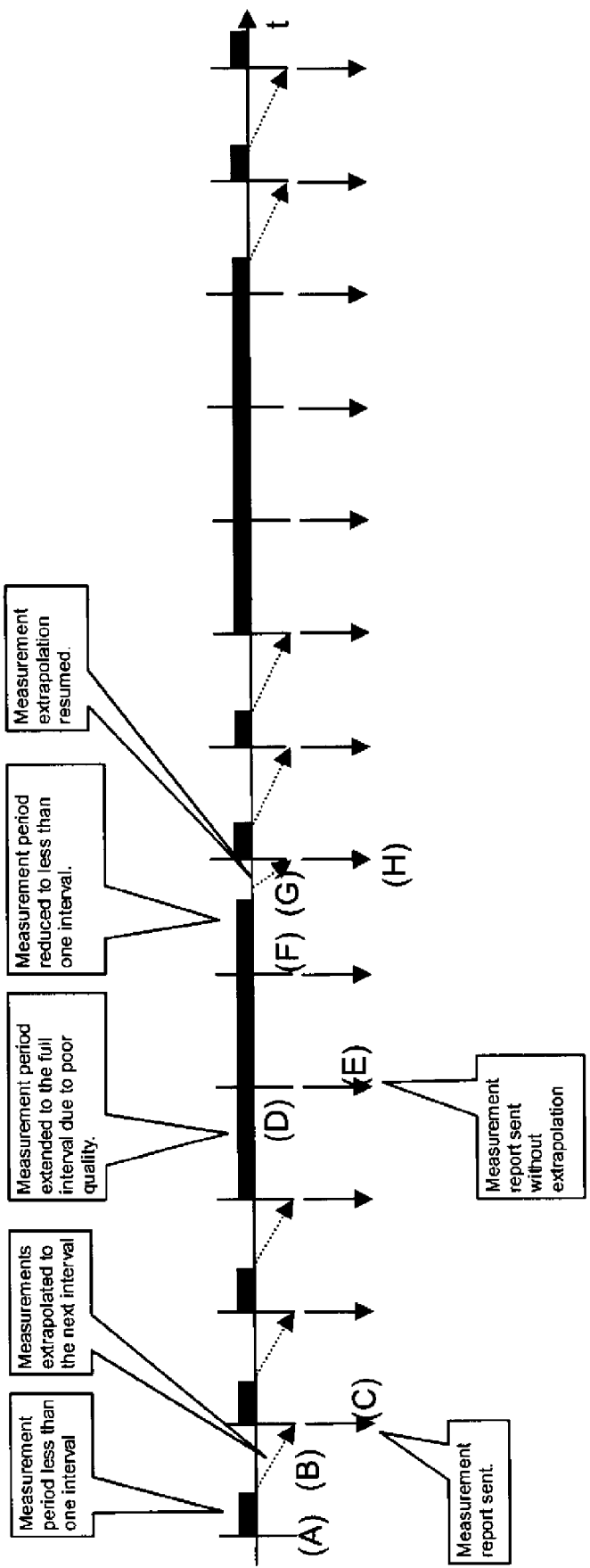
FIG. 5 is a diagram illustrating exemplary measurement periods resulting with the operation of FIG. 4.

Exemplary measurement periods resulting with an operation according to FIG. 4 are shown in FIG. 5, to which reference will be made as well. A measurement period is a period in which the GNSS signal measurement circuit 130 is active. In FIG. 5, a horizontal line represents time t, vertical lines divide the time into reporting periods or intervals of equal length, horizontal black bars represent a measurement period in a respective reporting period, vertical arrows pointing downwards represent a measurement report at the end of each reporting period, and sloped arrows with dotted lines represent an extrapolation of measurement results.

A navigation application implemented in the navigation engine 163 of the cellular engine 160 could require position information at fixed intervals to be able to determine precise navigation information which is then presented to a user via display 180. The position information is determined by the executed positioning code of the positioning engine 170 based on measurement results on satellite signals received from the measurement engine 120 in measurement reports at fixed intervals at the end of a respective reporting period and on data extracted by the measurement engine 120 from the satellite signals. The length of a reporting period could be fixed or be set by the executed setting code of the positioning engine 170. It could have for example a length of 1 second or of 10 seconds. The executed positioning code could either determine the position and velocity of the device 100 itself or, for a mobile assisted/network-based positioning, it could provide the received measurement report to a network server using a cellular communication. The network server may then determine the position and provide it to the executed positioning code or to some network application for further use. The executed assistance module of the positioning engine 170 could also be responsible for receiving assistance data, like a reference position, a reference time or ephemeris data, from a cellular network. The assistance data could then be provided via the interfaces 175, 150 to the GNSS signal measurement circuit 130 for enabling or accelerating an acquisition of satellite signals.

In the example of FIG. 5, a reporting period starts at label (A).

Starting from the beginning of a reporting period, the decision logic 210 of the control circuitry 140 receives and monitors measurement results from the GNSS signal measurement circuit 130. (action 401, 402) The measurement results may include for example code phase and Doppler frequency of acquired signals. The decision logic 210 monitors more specifically whether the signal quality of received GNSS signals was sufficient at the last measurement instant. The signal quality could be a quality with respect to the Dilution of Precision (DOP), to code phase measurement uncertainties and to Doppler measurement uncertainties, each including extrapolation errors. The extrapolation errors could be determined for instance as a function of the remaining time until the end of the current reporting period. Each considered quantity could be evaluated by the decision logic 210 for example by comparison with a threshold value that the quantity has to fall short of. Whether a sufficient signal quality is reached could depend on a desired accuracy. The desired accuracy could be fixed or be set by the setting code of the positioning engine 170 and be mapped to the threshold value for one or more evaluated quantities.

The monitoring of the quality can thus be considered a real-time evaluation of the expected position accuracy from the measurements extrapolated from the measurement instant to the reporting instant.

The quantities that are evaluated can be based on an evaluation of the measurement results and in addition on navigation data extracted from the received signals and possibly on assistance data received from the positioning engine 170. Navigation data and/or assistance data can be used for example for obtaining the position of the satellites from which signals are received to determine the DOP. The positioning engine 170 could also provide intermediate results enabling an estimation of an expected positioning accuracy.

When it is determined based on the received measurement results that the signal quality is sufficient, while the reporting period is still ongoing (action 402), the decision logic 210 takes care that the measurement results are stored in the memory 220 and that the GNSS signal measurement circuit 130 is put to a sleep mode (action 403). It could be an additional criterion to be checked by the decision logic 210 in action 402 that the measurement period during the current report period has exceeded a set minimum duration. The minimum duration ensures that the required extrapolation time will not be too long. If a minimum duration of measurements is monitored, the minimum duration could equally be fixed or be set by the executed setting code of the positioning engine 170. An indication about the end of the minimum duration could be provided to the decision logic 220 by the timer 240.

Putting the GNSS signal measurement circuit 130 to a sleep mode could affect all or some components of the GNSS signal measurement circuit 130, like memories, correlators, temperature controlled crystal oscillator (TCXO), etc. Further, additional component of the measurement engine 120 could be put to a sleep mode as well, like the memory 220 or the extrapolator 230. Even the decision logic 210 itself could be put to a sleep mode.

The time during which the measurement hardware is put into a sleep mode is indicated in FIG. 5 by label (B). The resulting total measurement period in this reporting period is thus less than one interval.

It is then determined by the decision logic 210 whether a wakeup time is reached (action 404) for reactivating the GNSS signal measurement circuit 130 again (action 405). An indication about the wakeup time could be provided to the decision logic 220 by the timer 240. In case the decision logic 220 itself was put to a sleep mode as well, the indication from the timer 240 could be at the same time a trigger to wake up the decision logic 210. Upon reactivation, the GNSS signal measurement circuit 130 continues performing measurements on received signals and providing the measurement results to the control circuitry 140 (action 401).

In addition, the decision logic 210 checks whether the reporting period has reached an end. (action 406) If this is the case, the decision logic 210 causes the extrapolator 230 to extrapolate the measurement results stored in the memory 220 from the measurement instant to the reporting instant. The extrapolated measurement results are sent by the extrapolator 230 in a measurement report via interfaces 150 and 162 to the positioning engine 170. (action 407) An indication about the end of the reporting period could be provided to the decision logic 220 by the timer 240.

The extrapolator 230 could be built in a simple embodiment for example with subtractors, multipliers and adders for each measurement result. The subtractors could then determine the difference between the measurement results at the last two measurement instants before the GNSS signal measurement circuit 130 was put to a sleep mode, the multipliers could multiply the difference by the number of measurements instants that would have followed until the end of the reporting period without sleep mode, and the adders could add the multiplication result to the measurement result at the last measurement instant before the GNSS signal measurement circuit 130 was put to a sleep mode. It is to be understood that various other arrangements could be provided as well.

For an alternative embodiment, it could be assumed that the measurement engine 120 measures code phase and Doppler at the end of the measurement period. Some advanced receivers may also measure Doppler rate of change and possibly also higher order acceleration terms. Code phase and Doppler measurements could then be extrapolated from the measurement time instant at the end of the measurement period to the reporting time instant as follows:

The Doppler measurement could be reported as such if no rate of change information is available, or in more advanced receivers the rate of change information could be used together with the knowledge of the elapsed time between the measurement time instant and the end of the reporting period to calculate the predicted Doppler value at the reporting time instant.

The code phase measurement at the measurement time instant could be extrapolated from the measurement time instant to the reporting time instant by using a known code chipping rate, e.g. 1.023 Mchip/second, corrected with the Doppler measurement and possibly the rate of change terms of the Doppler. Doppler measurement in Hertz can be converted to chip/second units using a known carrier cycles per code chip ratio, e.g. 1540 carrier cycles per code chip ratio.

The measurement engine might have the knowledge of the higher order acceleration terms, which may not necessarily be known in the positioning engine. The measurement engine has moreover a precise knowledge of the measurement time instant and the reporting time instant.

It has to be noted that in another embodiment, the decision logic 210 could also cause the extrapolator 230 to carry out the extrapolation before the measurement results are stored in the memory 220 so that the extrapolated measurement results are stored. In this case, the extrapolated measurement results only have to be retrieved from the memory 220, for example by the decision logic 210, for transmission in a measurement report. In yet another embodiment, the decision logic 210 could also cause the extrapolator 230 to carry out the extrapolation right after the last measurement instant and to send the measurement report to the positioning engine 170 as soon as available without any storing of results (action 407). This approach is feasible, for example, if only the navigation engine 163 needs new position information at fixed intervals, while the positioning engine 170 is able to process input that is received at variable intervals. This last embodiment is also reflected in FIG. 4 in that action 406 is represented by a diamond having dashed lines to show that the action is only optional.

Sending a first measurement report is illustrated in FIG. 5 with label (C).

The wakeup time monitored in action 404 could be equal to the end of the reporting period monitored in action 406.

In this case, actions 404 and 406 could be summarized by a single action. If the reporting interval is longer than one second, for example 10 seconds or 60 seconds etc., the measuring period could also start one or more seconds before the actual reporting instant to have enough time for good quality measurements. For example, if a measurement report is to be transmitted every 10th second to the positioning engine, the wakeup time and the end of the reporting period could both be set to the 9th second after the previous reporting instant. However, it would also be possible to wake up the GNSS signal measurement circuit 130 earlier to check the satellite signal availability if there is a suspicion that the measurement period would otherwise not be long enough after a long sleep period of, for example, more than 5 seconds.

The same process (actions 401-407) may be repeated for a couple of reporting periods, as long as the signal quality stays the same.

At some point, however, the end of a reporting period may be reached before it has been determined that the signal quality is sufficient. (actions 402, 411)

That is, the measurement period has extended to the full interval due to a poor signal quality. Such a situation is illustrated in FIG. 5 by label (D).

In this case, the decision logic 210 transmits the actual measurement results without extrapolation in a measurement report at the reporting instant via interface 150 to the positioning engine 170. (action 412) This is illustrated in FIG. 5 by label (E).

The measurements continue in this case without interruption for the next reporting period. (action 401)

When the signal quality improves again, the signal measurement period can be reduced again. That is, the measurements are stored in the memory 220 as soon as the signal quality is sufficient and the GNSS signal measurement circuit 130 is put to sleep for the rest of the reporting period. Waking up the measurement hardware again, extrapolating the stored measurement results and reporting the extrapolated measurement results at the reporting instant are realized as before. (actions 402-407)

The next reduced measurement period is illustrated in FIG. 5 by label (F), the associated extrapolation period by label (G) and the associated transmission of the measurement report by label (H). It may be noted that in this case, the extrapolation period (G) may be different from the previous extrapolation period (B), since the required signal quality may have been reached at a later point of time in the reporting period.

The navigation data extracted from the satellite signals may be provided to the positioning engine 170 as well in the measurement reports. However, it may equally be provided separately at longer intervals, as some of the data, like the ephemeris data, has a fairly long validity time.

In certain embodiments of the invention, the signal measuring period is thus not fixed or predefined, but will be controlled in real-time by a measurement engine without any involvement from higher-level logic and functions such as position calculation routines of a position engine. The measuring period can vary freely from reporting period to reporting period. If the quality of the signals changes fast, for example when driving into a tunnel, the measuring period can be extended from 100 ms to 1000 ms within a reporting interval of 1000 ms. The reverse applies when coming out from the tunnel. In this case, the measuring period can be reduced from 1000 ms to 100 ms for reasons of power saving. In spite of the varying measurement periods, the measurement results may be reported on exact intervals to keep the navigation application synchronized at a requested update rate. Errors resulting from the described extrapolation may be included in measurement quality parameters, e.g. code phase uncertainty and Doppler uncertainty, in the measurement report.

The quality of the received signals could also be evaluated by determining whether the current measurement results, including extrapolation errors, can be expected to result in a desired accuracy of a position estimate, when deciding on the length of the signal measuring period. The expected positioning accuracy can be determined for instance using
(1) the satellite geometry factor DOP and mean standard deviation of the code phase measurement uncertainties including the extrapolation errors;
(2) a circular error probable calculated from a covariance matrix weighted by the measurement uncertainties;
(3) the average code phase and/or Doppler uncertainties;
(4) or any combination of options 1 to 3.

Certain embodiments of the invention thus enable power savings without any impacts on the nominal reporting interval. The power savings can moreover be maximized without jeopardizing positioning accuracy. That is, the sleep/signal measuring periods are adaptive to ensure the best possible positioning performance and yet not wasting any more power than needed to produce the measurements. The power save period control may further reside in a measurement engine so that an involvement of a positioning engine and/or a host microcontroller unit (MCU) is not needed so that any power consumption in the host due to the presented approach can be avoided. No information about the previous position solution or quality of the previous measurements is needed.

In good signal conditions, in which power saving is possible and the measuring hardware is turned for example on for 200 ms and off for 800 ms during a reporting period of one second, the effects on the signal quality due to the extrapolation can be expected to be practically negligible.

Certain embodiments of the invention can further be implemented with low implications for a conventional navigation process while offering the same update rate to the application needing the data.

It has to be noted that any presented connection is to be understood in a way that the involved components are operationally coupled. Thus, the connections can be direct or indirect with any number or combination of intervening elements, and there may be merely a functional relationship between the components.

Further, any of the mentioned processors could be of any suitable type, for example a computer processor, an application-specific integrated circuit (ASIC), etc. Any of the mentioned memories could be implemented as a single memory or as a combination of a plurality of distinct memories, and may comprise for example a read-only memory, a flash memory or a hard disc drive memory etc. Furthermore, any other hardware components that have been programmed in such a way to carry out the described functions could be employed as well.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as field-programmable gate arrays, application-specific integrated circuits (ASICs), signal processing devices, and other devices.

The functions illustrated by decision logic 210 or the processor 310 executing program code 321 can also be viewed as means for monitoring a quality of received signals for which means for measuring provide measurement results, as means for causing a reporting of measurement results that are available at the end of a reporting period in the case that the quality does not exceed a set quality before an end of a reporting period, as means for putting the measurement circuit to a sleep mode in the case that the quality exceeds a set quality at a measurement instant before the end of the reporting period and as means for causing a reporting of extrapolated measurement results at the end of the reporting period in the case that the quality exceeds the set quality at a measurement instant before the end of the reporting period, the extrapolated measurement results being measurement results from a measurement instant before the measurement circuit was put to a sleep mode extrapolated to the end of the reporting period.

The program code 321 in memory 320 can also be viewed as comprising such means in the form of functional modules.

While there have been shown and described and pointed out fundamental novel features of the invention as applied to embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   monitoring a quality of received signals for which a measurement circuit provides measurement results;
   in the case that the quality does not exceed a set quality before an end of a reporting period, causing a reporting of measurement results that are available at the end of the reporting period; and
   in the case that the quality exceeds the set quality at a measurement instant before the end of the reporting period, putting the measurement circuit to a sleep mode and causing a reporting of extrapolated measurement results, the extrapolated measurement results being measurement results from a measurement instant before the measurement circuit was put to a sleep mode extrapolated to the end of the reporting period.

2. The method according to claim 1, wherein the measurement circuit put to a sleep mode is activated again one of:
   at a beginning of a next reporting period;
   at a predetermined time before a beginning of a next reporting period; and
   at a point of time before a beginning of a next reporting period that depends on a length of an extrapolation required for the current reporting period.

3. The method according to claim 1, wherein the quality of received signals is monitored by evaluating at least one of the following quantities:
   a dilution of precision determined for satellites transmitting the received signals;
   uncertainties in measuring a code phase of the received signal;
   uncertainties in measuring a Doppler frequency in the received signal; and
   a circular error probable.

4. The method according to claim 3, wherein the at least one evaluated quantity includes extrapolation errors.

5. The method according to claim 1, comprising receiving control information comprising at least one of:
   a maximum length for a required extrapolation that has to be ensured before putting the measurement circuit to the sleep mode;
   at least one target value for adjusting the set quality;
   a target value for an accuracy of position information, which is to be determined based on the reported measurement results, as a basis for adjusting the set quality;
   intermediate results enabling an estimation of an expected accuracy of position information, which is to be determined based on the reported measurement results; and
   a length of the reporting period.

6. The method according to claim 1, wherein the measurement results are reported as a basis for at least one of
   positioning calculations; and
   a navigation application.

7. The method according to claim 1, wherein the signals are satellite signals of a global navigation satellite system.

8. An apparatus comprising a control circuitry implemented in hardware or at least one processor and at least one memory including computer program code, the control circuitry configured to or the at least one memory and the computer program code configured to, with the at least one processor, cause the apparatus at least to perform:
   monitor a quality of received signals for which a measurement circuit provides measurement results;
   report measurement results that are available at the end of a reporting period, in the case that the quality does not exceed a set quality before an end of the reporting period; and
   put the measurement circuit to a sleep mode and cause a reporting of extrapolated measurement results, in the case that the quality exceeds the set quality at a measurement instant before the end of the reporting period, the extrapolated measurement results being measurement results from a measurement instant before the measurement circuit was put to a sleep mode extrapolated to the end of the reporting period.

9. The apparatus according to claim 8, wherein the control circuitry is configured to or the at least one memory and the computer program code are configured to, with the at least one processor, cause the apparatus to reactivate the measurement circuit put to a sleep mode one of:
   at a beginning of a next reporting period;
   at a predetermined time before a beginning of a next reporting period; and
   at a point of time before a beginning of a next reporting period that depends on a length of an extrapolation required for the current reporting period.

10. The apparatus according to claim 8, wherein the control circuitry is configured to or the at least one memory and the computer program code are configured to, with the at least one processor, cause the apparatus to monitor the quality of received signals by evaluating at least one of the following quantities:
    a dilution of precision determined for satellites transmitting the received signals;
    uncertainties in measuring a code phase of the received signal;
    uncertainties in measuring a Doppler frequency in the received signal; and
    a circular error probable.

11. The apparatus according to claim 10, wherein the at least one evaluated quantity includes extrapolation errors.

12. The apparatus according to claim 8, wherein the control circuitry is configured to or the at least one memory and the computer program code are configured to, with the at least one processor, cause the apparatus to receive control information comprising at least one of:
    a maximum length for a required extrapolation that has to be ensured before putting the measurement circuit to the sleep mode;
    at least one target value for adjusting the set quality;
    a target value for an accuracy of position information, which is to be determined based on the reported measurement results, as a basis for adjusting the set quality;
    intermediate results enabling an estimation of an expected accuracy of position information, which is to be determined based on the reported measurement results; and
    a length of the reporting period.

13. The apparatus according to claim 8, wherein the control circuitry is configured to or the at least one memory and the computer program code are configured to, with the at least one processor, cause the apparatus to report the measurement results as a basis for at least one of positioning calculations; and a navigation application.

14. The apparatus according to claim 8, wherein the signals are satellite signals of a global navigation satellite system.

15. The apparatus according to claim 8, comprising the measurement circuit.

16. The apparatus according to claim 15, wherein the control circuitry or the at least one memory and the at least one processor, on the one hand, and the measurement circuit, on the other hand, belong to a measurement engine and wherein the control circuitry is configured to or the at least one memory and the computer program code are configured to, with the at least one processor, cause the apparatus to report the measurement results to a positioning engine.

17. The apparatus according to claim 16, comprising the positioning engine, the positioning engine being configured to determine a position of the apparatus based on reported measurement results for use by a navigation application.

18. The apparatus according to claim 8, comprising a display.

19. The apparatus according to claim 8, wherein the apparatus is one of a module for an electronic device;

a mobile communication device; and a personal navigation device.

20. A non-transitory computer readable storage medium in which computer program code is stored, the computer program code causing an apparatus to perform the following when executed by a processor:

monitoring a quality of received signals for which a measurement circuit provides measurement results;

in the case that the quality does not exceed a set quality before an end of a reporting period, causing a reporting of measurement results that are available at the end of the reporting period; and in the case that the quality exceeds the set quality at a measurement instant before the end of the reporting period, putting the measurement circuit to a sleep mode and causing a reporting of extrapolated measurement results, the extrapolated measurement results being measurement results from a measurement instant before the measurement circuit was put to a sleep mode extrapolated to the end of the reporting period.

21. An apparatus comprising:

means for monitoring a quality of received signals for which means for measuring provide measurement results;

means for causing a reporting of measurement results that are available at the end of a reporting period in the case that the quality does not exceed a set quality before an end of a reporting period;

means for putting the measurement circuit to a sleep mode in the case that the quality exceeds a set quality at a measurement instant before the end of the reporting period; and means for causing a reporting of extrapolated measurement results in the case that the quality exceeds the set quality at a measurement instant before the end of the reporting period, the extrapolated measurement results being measurement results from a measurement instant before the measurement circuit was put to a sleep mode extrapolated to the end of the reporting period.

* * * * *